US007679480B2

(12) United States Patent
Stenerson et al.

(10) Patent No.: US 7,679,480 B2
(45) Date of Patent: Mar. 16, 2010

(54) METHOD FOR MAGNETIZING CASING STRING TUBULARS

(75) Inventors: Kenneth Stenerson, St. Albert (CA); Leon Ceh, Calgary (CA); Graham A. McElhinney, Aberdeenshire (GB)

(73) Assignee: Smith International, Inc., Houston, TX (US)

( * ) Notice: Subject to any disclaimer, the term of this patent is extended or adjusted under 35 U.S.C. 154(b) by 0 days.

(21) Appl. No.: 12/422,347

(22) Filed: Apr. 13, 2009

(65) Prior Publication Data

US 2009/0195340 A1 Aug. 6, 2009

Related U.S. Application Data

(62) Division of application No. 11/487,904, filed on Jul. 17, 2006, now Pat. No. 7,538,650.

(51) Int. Cl.

*H01F 7/20* (2006.01)
*H01F 13/00* (2006.01)
*G01V 3/08* (2006.01)
*G01V 3/00* (2006.01)

(52) U.S. Cl. ....................... 335/284; 324/345; 324/346; 324/355

(58) Field of Classification Search ................. 335/284; 324/345, 346, 355; 166/66.5

See application file for complete search history.

(56) References Cited

U.S. PATENT DOCUMENTS 2,671,197 A * 3/1954 Barnes et al. ............... 361/147
2,792,532 A * 5/1957 Becker ....................... 361/147
2,980,850 A 4/1961 Cochran
2,989,692 A * 6/1961 Price et al. .................. 324/242
3,117,065 A 1/1964 Wootten
3,725,777 A 4/1973 Robinson et al.
4,072,200 A 2/1978 Morris et al.
4,458,767 A 7/1984 Hoehn, Jr.
4,465,140 A 8/1984 Hoehn, Jr.
4,672,345 A 6/1987 Littwin et al.
4,730,230 A 3/1988 Helfrick (Continued)

FOREIGN PATENT DOCUMENTS

EP 0 301 671 B1 2/1989

(Continued)

OTHER PUBLICATIONS

A. G. Nekut, A. F. Kuckes, and R. G. Pitzer, "Rotating Magnet Ranging—a new drilling guidance technology," 8th One Day Conference on Horizontal Well Technology, Canadian Sections SPE/Petroleum Society, Nov. 7, 2001.

(Continued)

*Primary Examiner*—Elvin G Enad
*Assistant Examiner*—Mohamad A Musleh

(57) ABSTRACT

A method for magnetizing a wellbore tubular includes a positioning a wellbore tubular substantially coaxially in a plurality of longitudinally spaced magnetizing coils deployed on a frame. The coils are selectively connected and disconnected from electrical power such that a circumferential electrical current flows in each of the coils to impart a predetermined magnetic field pattern to the tubular. Exemplary embodiments of this invention provide for semi-automated control of tubular magnetization and thereby enable a repeatable magnetic pattern to be imparted to each of a large number of wellbore tubulars.

20 Claims, 6 Drawing Sheets

U.S. PATENT DOCUMENTS

| | | | |
|---|---|---|---|
| 4,743,849 | A | 5/1988 | Novikov |
| 4,931,760 | A | 6/1990 | Yamaguchi et al. |
| 5,025,240 | A | 6/1991 | La Croix |
| 5,126,720 | A | 6/1992 | Zhou et al. |
| 5,319,335 | A | 6/1994 | Huang et al. |
| 5,428,332 | A | 6/1995 | Srail et al. |
| 5,485,089 | A | 1/1996 | Kuckes |
| 5,512,830 | A | 4/1996 | Kuckes |
| 5,541,517 | A | 7/1996 | Hartmann et al. |
| 5,589,775 | A | 12/1996 | Kuckes |
| 5,657,826 | A | 8/1997 | Kuckes |
| 5,659,280 | A | 8/1997 | Lee et al. |
| 5,675,488 | A | 10/1997 | McElhinney |
| 5,923,170 | A | 7/1999 | Kuckes |
| 6,060,970 | A | 5/2000 | Bell |
| 6,310,532 | B1 | 10/2001 | Santa Cruz et al. |
| 6,369,679 | B1 | 4/2002 | Cloutier et al. |
| 6,670,806 | B2 | 12/2003 | Wendt et al. |
| 6,698,516 | B2 | 3/2004 | Van Steenwyk et al. |
| 6,991,045 | B2 | 1/2006 | Vinegar et al. |
| 2004/0051610 | A1 | 3/2004 | Sajan |
| 2004/0263300 | A1 | 12/2004 | Maurer et al. |
| 2006/0131013 | A1 | 6/2006 | McElhinney |

FOREIGN PATENT DOCUMENTS

| | | | |
|---|---|---|---|
| JP | 60086809 | A | 5/1985 |
| JP | 03094407 | A | 4/1991 |
| WO | WO95/19490 | | 7/1995 |

OTHER PUBLICATIONS

W-D Coils brochure by Western Instruments, published Mar. 2001: http://www.westerninstruments.com/portableMPI/coils/WD_COI_1.jpg, http://www.westerninstruments.com/portableMPI/coils/WD_COI_2.gif; and http://www.westerninstruments.com/portableMPI/coils/WD_COI_3.gif.

J.I. de Lange and T.J. Darling, "Improved detectability of blowing wells," SPE Drilling Engineering, Mar. 1990.

T.L. Grills, "Magnetic ranging technologies for drilling steam assisted gravity drainage well pairs and unique well geometries—A comparison of Technologies," SPE/Petroleum Society of CIM/CHOA 79005, 2002.

* cited by examiner

METHOD FOR MAGNETIZING CASING STRING TUBULARS

RELATED APPLICATIONS

This application is a division of U.S. patent application Ser. No. 11/487,904, filed Jul. 17, 2006, entitled APPARATUS FOR MAGNETIZING CASING STRING TUBULARS.

FIELD OF THE INVENTION

The present invention relates generally to drilling and surveying subterranean boreholes such as for use in oil and natural gas exploration. In particular, this invention relates to an apparatus and method for imparting a predetermined magnetic pattern to a casing string tubular.

BACKGROUND OF THE INVENTION

The use of magnetic field measurements in prior art subterranean surveying techniques for determining the direction of the earth's magnetic field at a particular point is well known. Techniques are also well known for using magnetic field measurements to locate subterranean magnetic structures, such as a nearby cased borehole. These techniques are often used, for example, in well twinning applications in which one well (the twin well) is drilled in close proximity and often substantially parallel to another well (commonly referred to as a target well).

The magnetic techniques used to sense a target well may generally be divided into two main groups; (i) active ranging and (ii) passive ranging. In active ranging, the local subterranean environment is provided with an external magnetic field, for example, via a strong electromagnetic source in the target well. The properties of the external field are assumed to vary in a known manner with distance and direction from the source and thus in some applications may be used to determine the location of the target well. In contrast to active ranging, passive ranging techniques utilize a preexisting magnetic field emanating from magnetized components within the target borehole. In particular, conventional passive ranging techniques generally take advantage of remanent magnetization in the target well casing string. Such remanent magnetization is typically residual in the casing string because of magnetic particle inspection techniques that are commonly utilized to inspect the threaded ends of individual casing tubulars.

In co-pending U.S. patent application Ser. No. 11/301,762 to McElhinney, a technique is disclosed in which a predetermined magnetic pattern is deliberately imparted to a plurality of casing tubulars. These tubulars, thus magnetized, are coupled together and lowered into a target well to form a magnetized section of casing string typically including a plurality of longitudinally spaced pairs of opposing magnetic poles. Passive ranging measurements of the magnetic field may then be advantageously utilized to survey and guide drilling of a twin well relative to the target well. This well twinning technique may be used, for example, in steam assisted gravity drainage (SAGD) applications in which horizontal twin wells are drilled to recover heavy oil from tar sands.

McElhinney discloses the use of, for example, a single magnetizing coil to impart the predetermined magnetic pattern to each of the casing tubulars. As shown on FIG. 1, a hand-held magnetizing coil 65 having a central opening (not shown) is deployed about exemplary tubular 60. A direct electric current is passed through the windings in the coil 65 (the current traveling circumferentially about the tubular), which imparts a substantially permanent, strong, longitudinal magnetization to the tubular 60 in the vicinity of the coil 65. After some period of time (e.g., 5 to 15 seconds) the current is interrupted and the coil 65 moved longitudinally to another portion of the tubular 60 where the process is repeated. To impart a pair of opposing magnetic poles, McElhinney discloses reversing the direction of the current about coil 65 or alternatively redeploying the coil 65 about the tubular 60 such that the electric current flows in the opposite circumferential direction. In the above described prior art method, substantially any number of discrete magnetic zone's may be imparted to a casing tubular to form substantially any number of pairs of opposing magnetic poles.

A SAGD well twinning operation typically requires a large number of magnetized casing tubulars (for example, in the range of about 50 to about 100 magnetized tubulars per target well). It will be readily appreciated, that drilling even a moderate number of such twin wells can result in the need for literally thousands of magnetized casing tubulars. While the above described manual method for magnetizing casing tubulars has been successfully utilized, it is both time and labor intensive. It is also potentially dangerous given the size and weight of a typical casing tubular (e.g., on the order of about 40 feet in length and 1000 pounds or more in weight). Moreover, such a manual process has the potential to lead to significant differences in the imparted magnetization from tubular to tubular, especially given the sheer number of magnetized tubulars required for a typical SAGD operation. It will be appreciated that in order to achieve optimum passive ranging results (and therefore optimum placement of the twin wells), it is preferable that each tubular have an essentially identical magnetic pattern imparted thereto.

Therefore, there exists a need for an apparatus and method for magnetizing a large number of casing tubulars. In particular, a semi or fully automated apparatus and method that reduces handling requirements and includes quality control would be advantageous.

SUMMARY OF THE INVENTION

Exemplary aspects of the present invention are intended to address the above described need for an apparatus and method for magnetizing a large number of casing tubulars. One aspect of this invention includes an apparatus for imparting a magnetic pattern to a casing string tubular. In one exemplary embodiment, the apparatus includes a plurality of co-axial magnetizing coils (also referred to in the art as gaussing coils and gaussing rings) deployed on a frame. The coils are typically deployed about a track on which the tubular may be traversed. The track may include, for example, a plurality of non-magnetic rollers deployed on the frame. Selected ones of the rollers may be driven, for example, via a motor. Advantageous embodiments may further include a magnetic field sensor disposed to measure the imparted magnetic field along the length of the tubular as it is removed from the track after magnetization. Further advantageous embodiments include a computerized controller in electronic communication with the coils and the magnetic field sensor.

Exemplary embodiments of the present invention provide several advantages over prior art magnetization techniques described above. For example, exemplary embodiments of this invention tend to enable a repeatable magnetic pattern to be imparted to each of a large number of wellbore tubulars. The magnetic pattern is repeatable both in terms of (i) the relative position of various magnetic features (e.g., pairs of opposing magnetic poles) along the length of the tubular and (ii) the magnetic field strength of those features. Such repeatability tends to provide for accurate distance determination during passive ranging, and therefore accurate well placement during twinning operations, such as SAGD drilling operations.

Exemplary embodiments of the present invention also advantageously provide for semi-automated quality control of tubular magnetization. For example, as described in more detail below, both the measured magnetic field along the length of the tubular and the applied current in the coils during magnetization may be processed as quality control parameters. These quality control measures tend to provide further assurance of tubular to tubular repeatability.

Exemplary embodiments of this invention also advantageously enable rapid magnetization of a large number of wellbore tubulars. Moreover, the apparatus and method require minimal handling of large tubulars and heavy coils, and therefore provide for improved safety during magnetization. Furthermore, as described in more detail below, exemplary embodiments of this invention are semi-automated, and can be configured to be nearly fully automated.

In one aspect, the present invention includes a method of magnetizing a wellbore tubular. The method includes positioning a wellbore tubular substantially coaxially in a plurality of longitudinally spaced magnetizing coils deployed on a frame and connecting the plurality of magnetizing coils to an electrical power source. The connection causes a circumferential non-alternating electrical current to flow in a clockwise direction about the wellbore tubular in a first subset of the coils and in a counterclockwise direction about the wellbore tubular in a second subset of the coils so as to impart a predetermined magnetic field pattern to the wellbore tubular having at least one pair of opposing magnetic poles. The method further includes disconnecting the magnetizing coils from the electrical power source and removing the wellbore tubular from the coils.

In another aspect, the invention includes a method of magnetizing a wellbore tubular. The method includes positioning a wellbore tubular substantially coaxially in a plurality of longitudinally spaced magnetizing coils deployed on a frame and connecting the plurality of magnetizing coils to an electrical power source. The connection causes a circumferential non-alternating electrical current to flow in each of the coils so as to impart a predetermined magnetic field pattern to the tubular. The method further includes disconnecting the magnetizing coils form the electrical power source and removing the wellbore tubular from the magnetizing coils. A magnetic field is measured along a length of the wellbore tubular as the tubular is moved axially relative to a magnetic field sensor while being removed from the coils. The measured magnetic field is processed so as to determine whether or not the magnetic field pattern imparted to the wellbore tubular is within predetermined limits.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realize by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
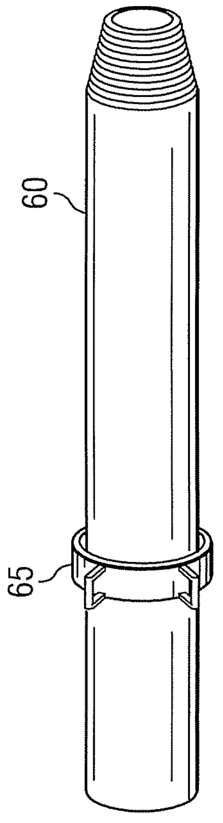
FIG. 1 (PRIOR ART)
FIG. 1 depicts a prior art arrangement for magnetizing a casing tubular.

With reference to FIGS. 2A through 6, it will be understood that features or aspects of the exemplary embodiments illustrated may be shown from various views. Where such features or aspects are common to particular views, they are labeled using the same reference numeral. Thus, a feature or aspect labeled with a particular reference numeral on one view in FIGS. 2A through 6 may be described herein with respect to that reference numeral shown on other views.

Figure 2A:
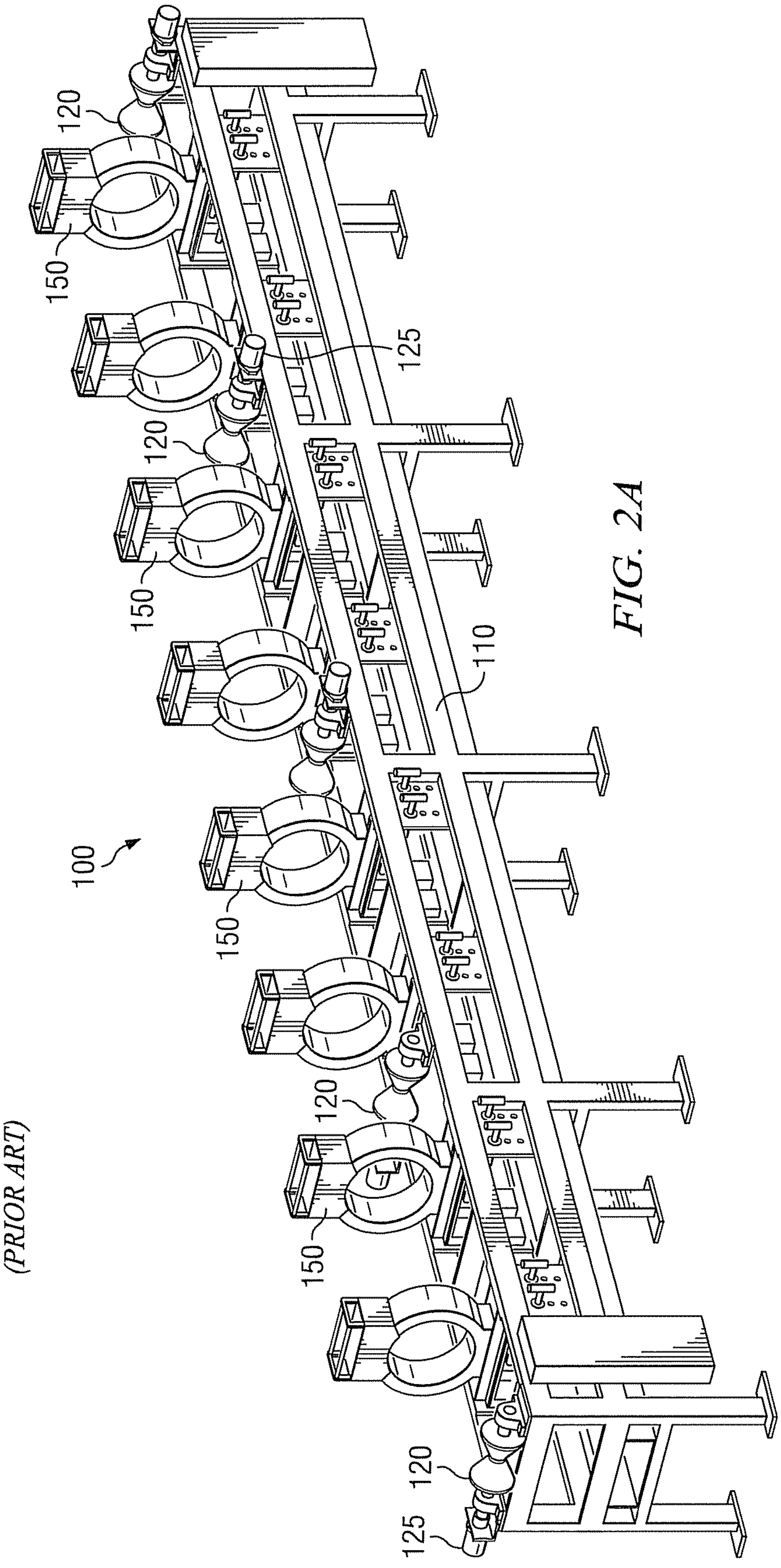
FIG. 2A depicts one exemplary embodiment of an apparatus for magnetizing casing tubulars according to the principles of the present invention.
Figure 2B:
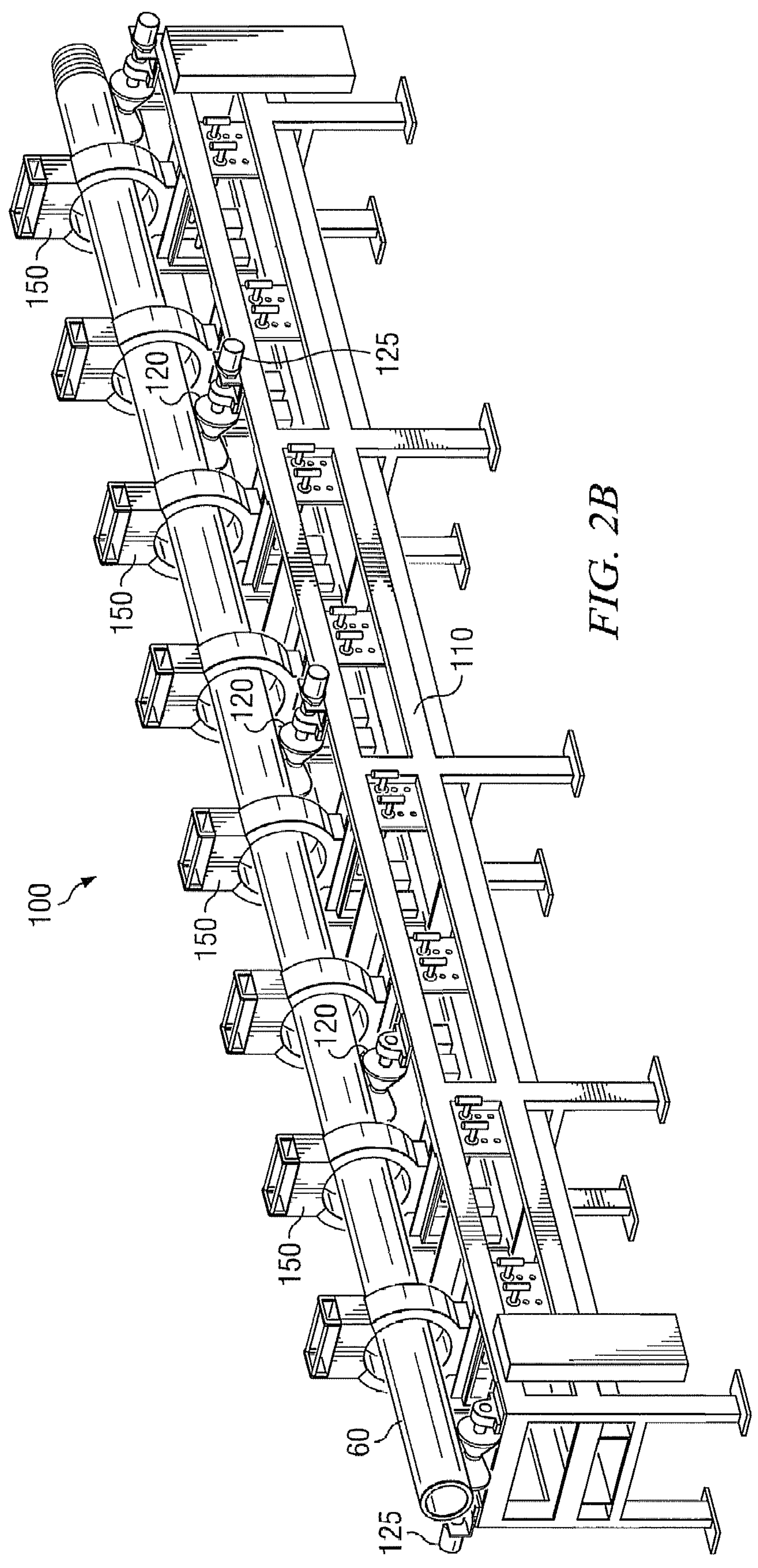
FIG. 2B depicts the apparatus of FIG. 2A with an exemplary tubular deployed therein.

Referring now to FIGS. 2A and 2B, one exemplary embodiment of an apparatus 100 in accordance with the present invention is shown in perspective view. In FIG. 2B, apparatus 100 is shown with an exemplary tubular 60 deployed therein. Otherwise, FIGS. 2A and 2B are identical. In the exemplary embodiment shown, apparatus 100 includes a plurality of rollers 120 deployed on a nonmagnetic (e.g., aluminum) frame 110. The plurality of rollers may be thought of as a track along which tubulars 60 may be moved in a direction substantially parallel with their longitudinal axis. As such, the portion of the rollers in contact with the tubular 60 is typically fabricated from a non magnetic material such as nylon or a urethane rubber). Exemplary embodiments of apparatus 100 may further include one or more motors 125 (e.g., electric or hydraulic motors) deployed on the frame 110 and disposed to drive selected ones (or optionally all) of the rollers 120. In such exemplary embodiments, the tubulars may be advantageously driven along the length of the track thereby reducing tubular handling requirements and enabling the tubulars 60 to be accurately and repeatably positioned along the track. Hydraulic motors are typically preferred to avoid magnetic interference with the magnetized tubulars 60 (although the invention is not limited in this regard). Apparatus 100 may also optionally include one or more positioning sensors (e.g., infrared sensors) disposed to detect the relative position of a tubular 60 along the track. The use of such sensors, in combination with computerized control of motors

125, advantageously enables automatic positioning of the tubulars 60 on the track. Of course, other known techniques may also be utilized for automatically determining the position of the tubulars on the track. The invention is not limited in these regards.

With continued reference to FIGS. 2A and 2B, apparatus 100 further includes a plurality of magnetizing coils 150 deployed on the frame 110. The coils 150 are substantially coaxial with one another and are disposed to receive tubular 60 as shown on FIGS. 2B and 3. Suitable coils include, for example, model number WDV-14, available from Western Instruments, Inc., Alberta, Canada. Advantageous embodiments typically include from about 4 to about 32 magnetizing coils 150, although the invention is not limited in this regard. In general, embodiments having a large number of regularly spaced coils 150 (e.g., 8 or more) tend to be advantageous in that they enable more magnetic force to be imparted to the tubulars 60. This tends to provide a stronger, more uniform magnetic field about the casing string and thus enables more accurate and reliable passive ranging. It will of course be appreciated that the advantages inherent in increasing the number of coils 150 should be balanced by the increased cost and power consumption of such embodiments. Moreover, the use of an excessive number of coils 150 can be disadvantageous in that magnetic flux from one coil can interfere with flux from neighboring coils as the axial spacing between neighboring coils decreases.

As described above in the Background of the Invention, wellbore tubulars 60 are typically magnetized such that they include at least one opposing pair of magnetic poles (north north or south south). It will be understood that the preferred spacing of pairs of opposing poles along a casing string depends on many factors, such as the desired distance between the twin and target wells, and that there are tradeoffs in utilizing a particular spacing. In general, the magnetic field strength about a casing string (or section thereof) becomes more uniform along the longitudinal axis of the casing string with reduced spacing between the pairs of opposing poles (i.e., increasing the ratio of pairs of opposing poles to tubulars). However, the fall off rate of the magnetic field strength as a function of radial distance from the casing string tends to increase as the spacing between pairs of opposing poles decreases. Thus, it may be advantageous to use a casing string having more closely spaced pairs of opposing poles for applications in which the desired distance between the twin and target wells is relatively small and to use a casing string having a greater distance between pairs of opposing poles for applications in which the desired distance between the twin and target wells is larger. Moreover, for some applications it may be desirable to utilize a casing string having a plurality of magnetized sections, for example a first section having a relatively small spacing between pairs of opposing poles and a second section having a relatively larger spacing between pairs of opposing poles. Therefore, advantageous embodiments of apparatus 100 enable a wide range of magnetic patterns (e.g., substantially any number of pairs of opposing poles having substantially any spacing) to be imparted to the tubulars.

The exemplary embodiment shown on FIGS. 2A and 2B includes 8 coils 150 deployed at regular 6-foot intervals along the length of track 110. The exemplary embodiment shown on FIG. 6 (and described in more detail below) includes 16 coils 150 deployed at regular 3-foot intervals. The exemplary embodiment shown on FIGS. 2A and 2B advantageously enables up to seven pairs of opposing poles to be imparted along the length of the tubular (e.g., at any of the seven midpoints between adjacent pairs of coils 150). Likewise, the exemplary embodiment shown on FIG. 6 advantageously enables up to 15 pairs of opposing poles to be imparted along the length of the tubular (e.g., at any of the 15 midpoints between adjacent pairs of coils 150). For example only, in these exemplary embodiments, a single pair of opposing north-north poles may be imparted to the approximate center of each tubular and a south pole to each end of the tubular.

Figure 4:
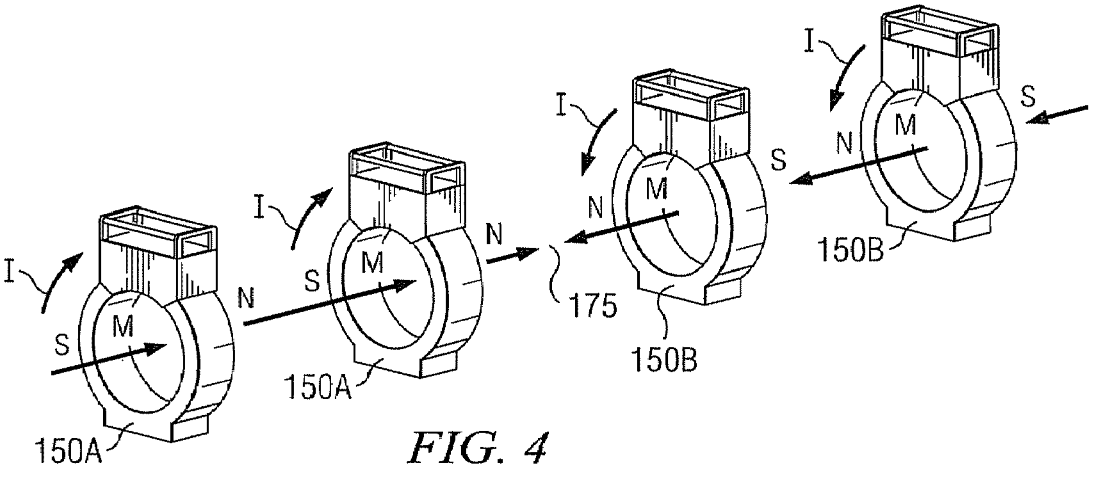
FIG. 4 schematically depicts a portion of the exemplary embodiment shown on FIG. 2A.

With reference now to FIG. 4, a pair of opposing poles may be imparted, for example, by polarizing adjacent coils 150 in opposite directions. Magnetizing coils 150A are polarized such that an electrical current I is induced in a clockwise direction about the coils 150A, which in turn induces a magnetic field M having north N and south S poles as shown. Magnetizing coils 150B are polarized in the opposite direction (as coils 150A) such that electrical current I is induced in a counterclockwise direction about the coils 150B, which in turn induces an opposing magnetic field M having north N and south S poles in the opposite direction as shown. An opposing pair of north-north NN poles is thereby induced as shown schematically at 175. It will be appreciated that the coil polarity may be set either manually (e.g., via a switch on the coil 150) or automatically (e.g., via disposing the coils 150 in electronic communication with a computerized controller as shown on FIG. 6 and discussed in more detail below). The invention is not limited in this regard.

In certain exemplary embodiments, it may be advantageous to provide each of the coils 150 with magnetic shielding (not shown) deployed on one or both of the opposing longitudinal ends thereof. The use of magnetic shielding would tend to localize the imposed magnetization in the tubular, for example, by reducing the amount of magnetic flux (provided by the coil) that extends longitudinally beyond the coil 150. In one exemplary embodiment, such magnetic shielding may include, for example, a magnetically permeable metallic sheet deployed about the tubular at the longitudinal faces of each coil 150.

Figure 3:
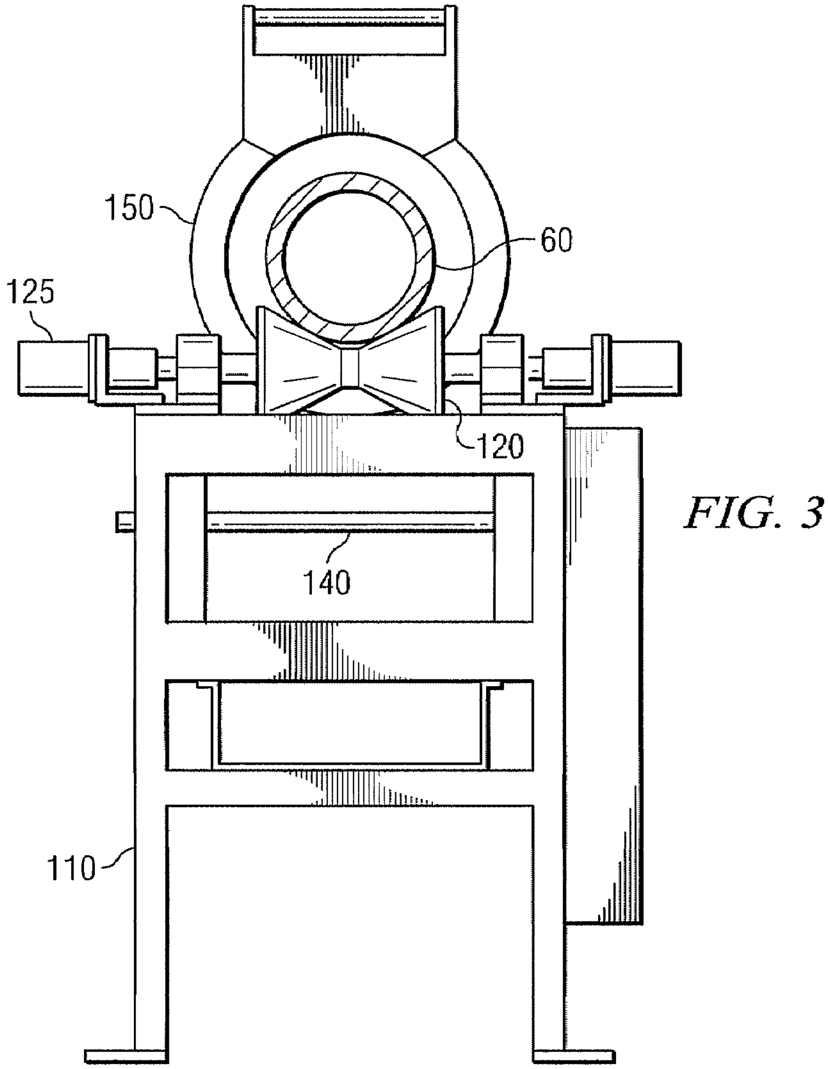
FIG. 3 depicts a front view of the apparatus of FIG. 2A with an exemplary tubular deployed therein.
Figure 5:
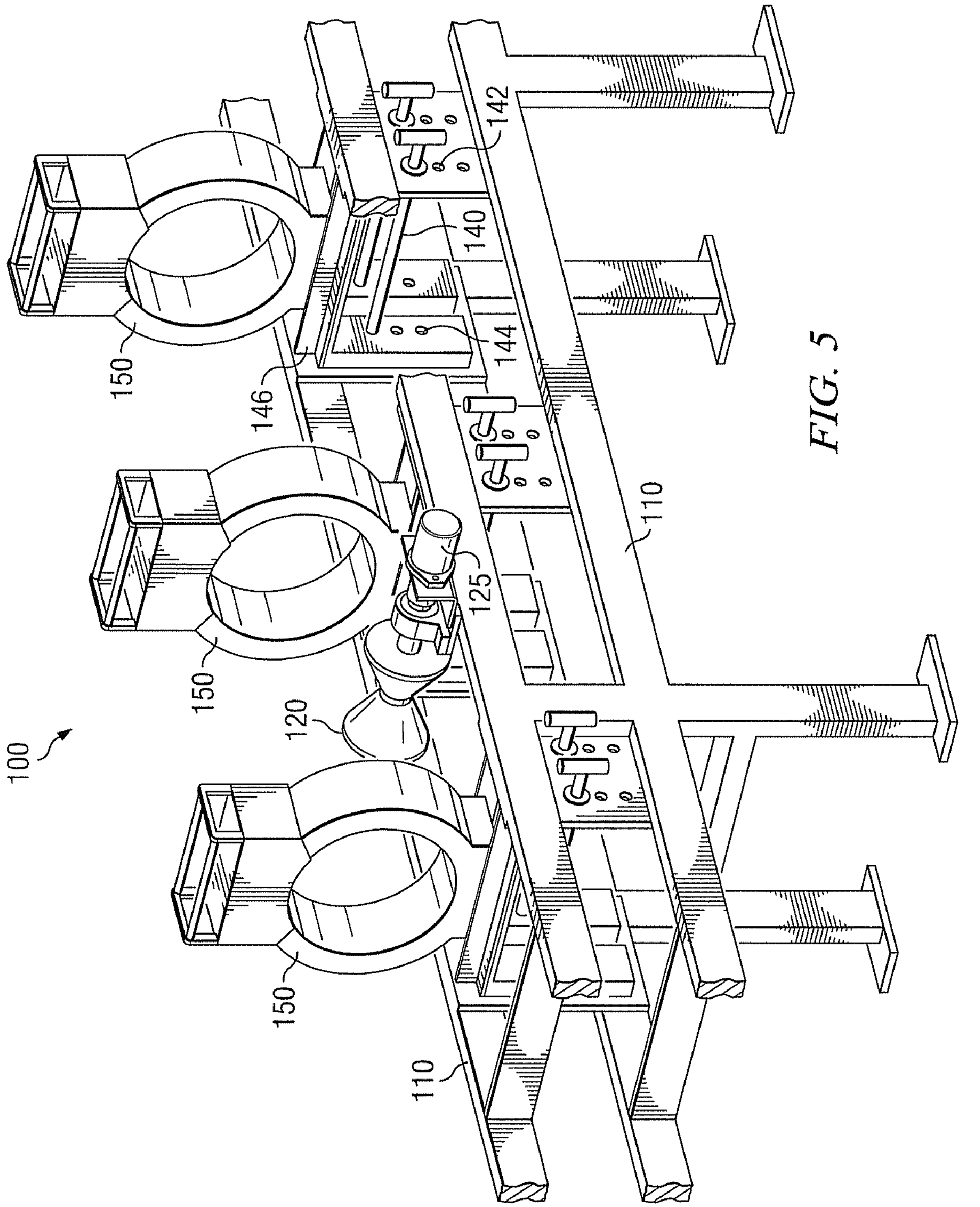
FIG. 5 depicts a portion of the exemplary embodiment shown on FIG. 2A.

It is well known to those of ordinary skill in the art that there are many standard tubular diameters. Moreover, it is not uncommon for a single well to utilize more than one casing diameter. For example, many wells have a relatively large diameter near the surface (e.g., 9 to 12 inch) and a relatively small diameter (e.g., 6 to 9 inch) near the bottom of the well. In order to accommodate a range of tubular diameters, the magnetizing coils 150 may be disposed to move vertically with respect to the frame 110. Such movement of the coils 150 enables them to be precisely centered about the tubulars 60 (FIG. 3). The coils 150 may be moved upward, for example, to accommodate larger diameter tubulars and downward to accommodate smaller diameter tubulars. In the exemplary embodiment shown on FIGS. 2A and 2B, each of the coils 150 may be manually moved into one of three predetermined vertical positions. With reference to FIG. 5, each coil 150 is deployed on a bracket 146 having through holes 144. The coil 150 (and bracket 146) may be moved vertically until a pair of through holes 144 align with a corresponding pair of through holes 142 on the frame 110. The coil 150 (and bracket 146) may then be pinned in place via pins 140. The invention is, of course, not limited in this regard. In an alternative embodiment, the coils 150 may be moved vertically via computer-controlled stepper motors, for example, which provide for automatic centering of the coils 150 about the tubulars 60.

It will be understood that centering the tubulars 60 in the coils 150 may also be accomplished by disposing the rollers 120 to move vertically with respect to the frame 110. In such an alternative embodiment, the rollers would be moved downwards to accommodate larger diameter tubulars and upwards to accommodate smaller diameter tubulars. The invention is not limited in these regards.

Figure 6:
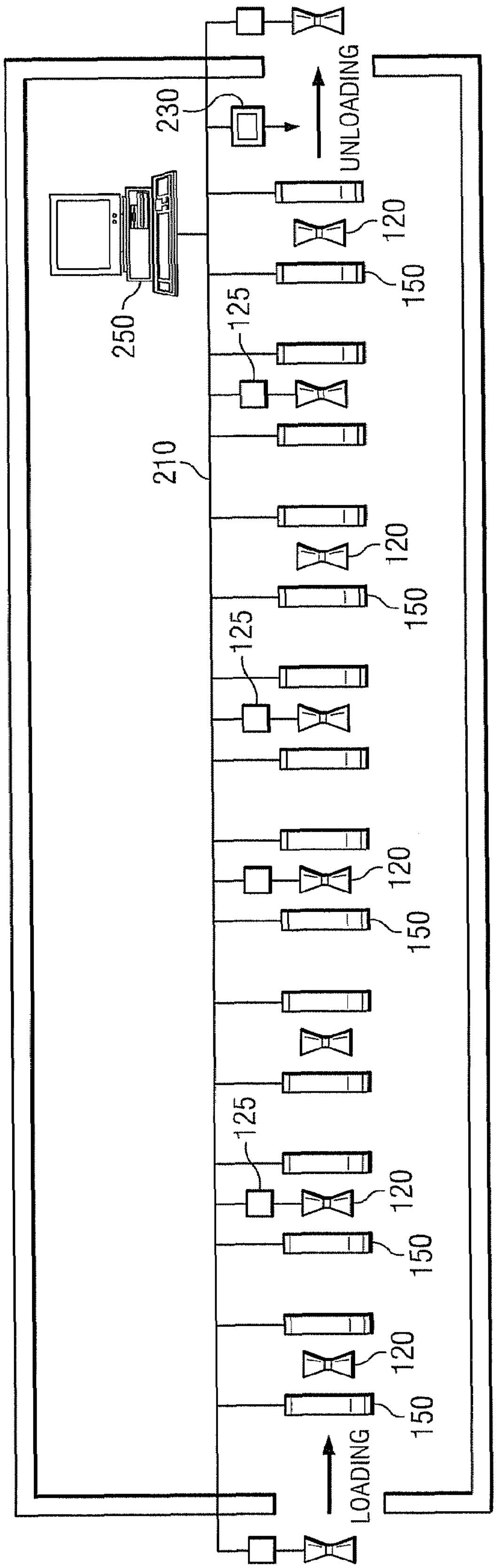
FIG. 6 depicts an exemplary embodiment of a semi-automated apparatus for magnetizing casing tubulars according to the principles of the present invention.

With reference now to FIG. 6, a semi-automated embodiment of an apparatus 200 in accordance with this invention is schematically depicted. Apparatus 200 is similar to apparatus 100 described above with respect to FIGS. 2A through 3 in that it includes a plurality of coaxial magnetizing coils 150 deployed on a frame (not shown on FIG. 6). Apparatus 200 also includes a plurality of hydraulic motors 125 operatively coupled to selected ones of rollers 120 for moving tubulars along a track (i.e., loading, positioning, and unloading the tubulars). Apparatus 200 differs from apparatus 100 in that the magnetizing coils 150 and hydraulic motors 125 are in electronic communication 210 with a computerized controller 250. As such, exemplary embodiments of apparatus 200 enable casing tubulars to be substantially automatically (i) loaded, (ii) longitudinally positioned in the coils 150, (iii) magnetized, and (iv) unloaded from the apparatus 200 after magnetization.

In the exemplary embodiment shown, computerized controller 250 may be advantageously configured to connect and disconnect each of the coils 150 to and from electrical power. For example, the coils 150 may be simultaneously connected and disconnected from electrical power. In this manner, the entire tubular may be advantageously magnetized in only a few seconds (e.g., about 10), thereby readily enabling large numbers of tubulars to be magnetized in a short period of time. The invention is not limited in this regard, however, as two or more groups of the coils 150 may also be sequentially connected and disconnected from the electrical power, for example, to advantageously limit peak power requirements. The exemplary embodiment shown on FIG. 6, may include, for example, four groups of coils (each including four coils). The controller 250 may be configured to connect the second group to electrical power when the first group is disconnected, the third group when the second group is disconnected, and so on. In this manner, the entire tubular may be magnetized in about 20 to 30 seconds, but with one-fourth the peak power requirements of a simultaneous magnetization scheme. Of course, the invention is not limited in these regards. As stated above, controller 250 may also be configured to control the electrical polarity of each of the coils 150 (i.e., the direction of the electrical current about the tubular), thereby providing for automatic control of the placement of pairs of opposing magnetic poles along the length of the tubular 60. Moreover, in certain applications it may be advantageous to utilize a subset of the coils 150, for example, to magnetize only a portion of the tubular.

In the exemplary embodiment shown, tubulars are loaded and unloaded on opposing sides of the apparatus 200 (as shown on the left and right sides of the figure). The invention is also not limited in this regard. Tubulars may be equivalently loaded and unloaded from the same side of the apparatus 200. This may be advantageous, for example, in a portable configuration, such as one in which the apparatus 200 is deployed on a truck/trailer (e.g., so that it may be transported to a drilling site).

With continued reference to FIG. 6, advantageous embodiments of apparatus 200 further include a magnetic sensor 230 deployed on the frame (not shown) and disposed in electronic communication with controller 250. In the exemplary embodiment shown, the sensor 230 is disposed to measure the magnetic field emanating from the tubular along its length as it passes thereby during unloading. As described in more detail below, such magnetic field data may be advantageously utilized for quality control purposes. In the exemplary embodiment shown, substantially any suitable one, two, or three-axis magnetic sensor may be utilized, such as a KOSHAVA 4 Gaussmeter, available from Wuntronic, Munich, Germany or a Model 460 Gaussmeter available from Lakeshore Cryotronics, Inc. It will be understood that the foregoing commercial sensor packages are identified by way of example only, and that the invention is not limited to any particular deployment of commercially available sensors.

Figure 7:
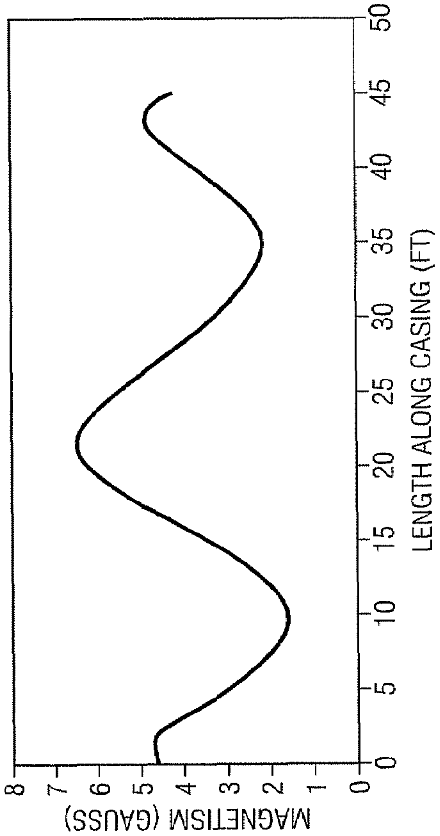
FIG. 7 depicts a plot of magnetic field strength along the length of an exemplary magnetized tubular, which ma be used as quality control data in accordance with the present invention.

With reference now to FIG. 7, exemplary quality control data is shown. FIG. 7 depicts an exemplary plot of the measured cross-axial magnetic field strength in Gauss as a function of length along a tubular that includes a single pair of opposing north-north poles at the midpoint thereof. Consistent with such a magnetic profile, the cross-axial magnetic field along the length of the tubular is at a maximum adjacent the pair of opposing poles and decreases to minima located between the pair of opposing poles and the ends of the tubular. It will be understood that the magnitude of the magnetic field and the location of various maxima and minima along the length of the tubular may be utilized for quality control purposes using conventional quality control procedures. Other quality control parameters may also be derived from the measured casing magnetism. For example, the magnetic field may be integrated along the length of the coil to determine a "total magnetism" imparted to the tubular. It will be appreciate that the electrical current and voltage at each of the coils 150 may also be measured during magnetization to ensure that the coils are functioning according to manufacturer's specifications.

As stated above, exemplary embodiments of apparatuses 100 and 200 may be advantageously utilized to repeatably magnetize a large number of wellbore tubulars in rapid succession. Prior to magnetization, the tubulars are loaded onto the track (e.g., the nylon rollers) in a loading area. They are then rolled longitudinally along the track, for example, via one or more powered rollers to a predetermined magnetization position. A plurality of magnetizing coils is then powered (e.g., substantially simultaneously) such that a circumferential current flows in each of the coils. As described above, the electrical current imparts a substantially permanent magnetization to the tubular. The magnetized tubular may then be optionally rolled longitudinally along the track in sensory range of a magnetic sensor to an unloading area, where it is removed from the track and stored for future use (or deployed directly into a borehole). As described above, the measured magnetic field is typically processed to determine whether or not the imparted magnetization meets predetermined specifications.

It will be appreciated that the tubulars need not be stationary during magnetization thereof as in the exemplary method embodiment described above. The tubulars may also be traversed along a portion of the track (through the coils 150) during magnetization thereof. In such an embodiment, slower movement of the tubular would tend to result in a stronger magnetization thereof (for a given electrical current in each of the coils). To form a pair of opposing magnetic poles the direction (polarity) of the electric current may be changed in one or more of the coils 150 when the tubular reaches some predetermined location (or locations) along the track (which could be determined automatically, for example, via an optical sensor). It will be appreciated that movement of the tubulars along the track during magnetization (i.e., while one or more coils are energized) may require additional safety precautions to prevent, for example, unexpected movement of the tubular.

Figure 8:
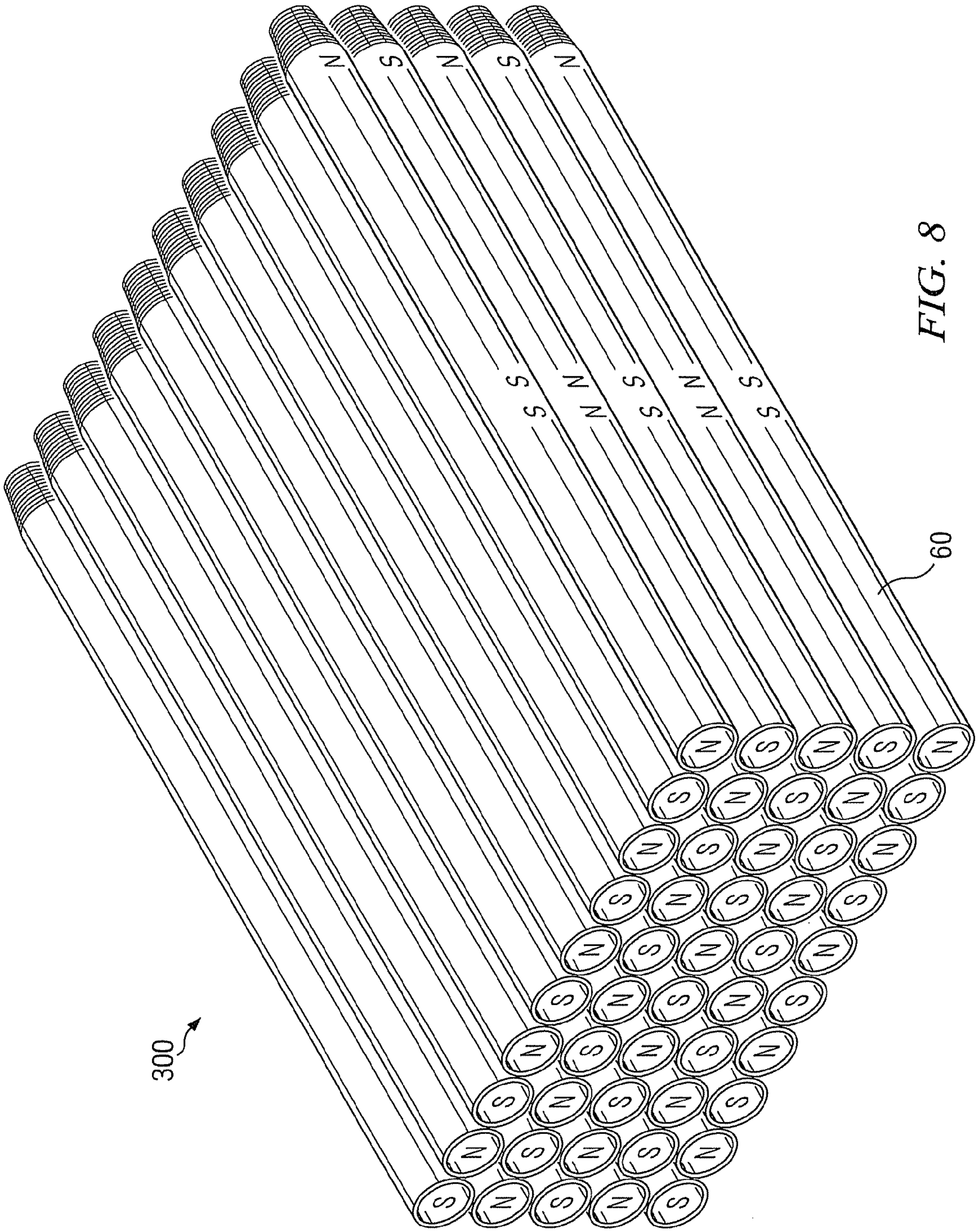
FIG. 8 depicts an exemplary stack of magnetized wellbore tubulars in accordance with another aspect of the present invention.

With reference now to FIG. 8, one exemplary embodiment of a stack 300 of magnetized casing tubulars 60 is shown. Magnetized tubulars 60 may be stacked, for example, in a warehouse for future deployment in a borehole and/or on a truck bed for transport to a drilling site prior to deployment in a borehole. As described above, the magnetized tubulars 60 each include a plurality of north N and south S magnetic poles. These magnetic poles are typically imparted to substantially the same longitudinal position along the tubulars (for example, as shown on selected tubulars 60 in FIG. 8). While the invention is not limited in this regard, a stack 300 typically includes 20 or more magnetized tubulars 60 arranged in a plurality of rows and columns. In the exemplary embodiment shown on FIG. 8, the magnetized tubulars 60 are stacked side by side and atop one another such that the magnetic poles on one tubular are radially aligned with magnetic poles of an opposite polarity on adjacent tubulars. Such a configuration has been found to advantageously substantially eliminate "degaussing" (weakening of the imparted magnetic field) of the magnetized tubulars 60 that can be caused by magnetic interaction of the magnetic poles on adjacent tubulars 60. It will be appreciated that the rows of tubulars 60 may also be spaced (e.g., via conventional 4×4s deployed transverse to the tubulars) so that adjacent rows are not in direct contact with one another as shown in FIG. 8.

It will further be appreciated that exemplary embodiments of the invention may be utilized to "remagnetize" previously magnetized tubulars, for example, magnetized tubulars that fail one or both of the above described quality control checks. The invention may also be utilized to "degauss" a previously magnetized tubular.

Although the present invention and its advantages have been described in detail, it should be understood that various changes, substitutions and alternations can be made herein without departing from the spirit and scope of the invention as defined by the appended claims.

We claim:

1. A method of magnetizing a wellbore tubular, the method comprising:

(a) positioning a wellbore tubular substantially coaxially in a plurality of longitudinally spaced magnetizing coils deployed on a frame via driving the tubular in an axial direction along a track of non-magnetic rollers with an electric motor;

(b) connecting the plurality of magnetizing coils to an electrical power source such that a circumferential non-alternating electrical current flows in a clockwise direction about the wellbore tubular in a first subset of the coils and in a counterclockwise direction about the wellbore tubular in a second subset of the coils so as to impart a predetermined magnetic field pattern to the wellbore tubular having at least one pair of opposing magnetic poles;

(c) disconnecting the magnetizing coils from the electrical power source; and (d) removing the wellbore tubular from the coils via driving the tubular in an axial direction along a track of non-magnetic rollers with an electric motor.

2. The method of claim 1, wherein the plurality of magnetizing coils comprises from about 4 to about 32 longitudinally spaced magnetizing coils, the coils being longitudinally spaced at a regular interval along a length of the tubular.

3. The method of claim 1, wherein (d) further comprises measuring a magnetic field along a length of the tubular as the tubular is moved axially relative to a magnetic field sensor.

4. The method of claim 3, further comprising:

(e) processing the magnetic field measured in (d) to determine whether or not the magnetic field pattern imparted in (b) is within predetermined limits.

5. The method of claim 1, wherein the wellbore tubular comprises a casing string tubular.

6. The method of claim 1, wherein the magnetizing coils are substantially simultaneously connected and disconnected from the electrical power.

7. The method of claim 1, wherein:

the plurality of magnetizing coils comprise a plurality of groups of magnetizing coils, each group including at least two magnetizing coils; and the groups of magnetizing coils are sequentially connected and disconnected from the electrical power.

8. The method of claim 1, further comprising:

(e) repeating (a) through (d) for a plurality of wellbore tubulars; and (f) arranging the plurality of wellbore tubulars in a stack, the wellbore tubulars stacked side by side such that magnetic poles on one tubular are radially aligned with magnetic poles of an opposite polarity on adjacent tubulars.

9. The method of claim 1, wherein (a) further comprises sensing a relative position of the wellbore tubular on the track using at least one positioning sensor.

10. A method of magnetizing a wellbore tubular, the method comprising:

(a) positioning a wellbore tubular substantially coaxially in a plurality of longitudinally spaced magnetizing coils deployed on a frame via driving the tubular in an axial direction along a track of non-magnetic rollers with an electric motor;

(b) connecting the plurality of magnetizing coils to an electrical power source such that a circumferential non-alternating electrical current flows in each of the coils to impart a predetermined magnetic field pattern to the tubular;

(c) disconnecting the magnetizing coils form the electrical power source;

(d) removing the wellbore tubular from the magnetizing coils via driving the tubular in an axial direction along a track of non-magnetic rollers with an electric motor;

(e) measuring a magnetic field along a length of the wellbore tubular as the tubular is moved axially relative to a magnetic field sensor while being removed in (d); and (f) processing the magnetic field measured in (e) to determine whether or not the magnetic field pattern imparted in (b) is within predetermined limits.

11. The method of claim 10, wherein the plurality of magnetizing coils comprises from about 4 to about 32 longitudinally spaced magnetizing coils, the coils being longitudinally spaced at a regular interval along a length of the tubular.

12. The method of claim 10, wherein said connecting in (b) causes electrical current to flow in a clockwise direction about the wellbore tubular in a first subset of the coils and in a counterclockwise direction about the wellbore tubular in a second subset of the coils.

13. The method of claim 12, wherein the predetermined magnetic field pattern imparted in (b) comprises at least one pair of opposing magnetic poles.

14. The method of claim 12, further comprising:

(g) repeating (a) through (f) for a plurality of wellbore tubulars; and (h) arranging the plurality of wellbore tubulars in a stack, the wellbore tubulars stacked side by side such that magnetic poles on one tubular are radially aligned with magnetic poles of an opposite polarity on adjacent tubulars.

15. A method of magnetizing a wellbore tubular, the method comprising:

(a) positioning a wellbore tubular substantially coaxially in a plurality of longitudinally spaced magnetizing coils deployed on a frame;

(b) connecting the plurality of magnetizing coils to an electrical power source such that a circumferential non-alternating electrical current flows in a clockwise direction about the wellbore tubular in a first subset of the coils and in a counterclockwise direction about the wellbore tubular in a second subset of the coils so as to impart a predetermined magnetic field pattern to the wellbore tubular having at least one pair of opposing magnetic poles;

(c) disconnecting the magnetizing coils from the electrical power source; and (d) removing the wellbore tubular from the coils and measuring a magnetic field along a length of the tubular as the tubular is moved axially relative to a magnetic field sensor; and (e) processing the magnetic field measured in (d) to determine whether or not the magnetic field pattern imparted in (b) is within predetermined limits.

16. The method of claim 15, wherein the wellbore tubular is positioned in (a) and removed in (d) by driving the wellbore tubular in an axial direction along a track of non-magnetic rollers with an electric motor.

17. The method of claim 16 wherein (a) further comprises sensing a relative position of the wellbore tubular on the track using at least one positioning sensor.

18. The method of claim 15, further comprising:

(f) repeating (a) through (d) for a plurality of wellbore tubulars; and (g) arranging the plurality of wellbore tubulars in a stack, the wellbore tubulars stacked side by side such that magnetic poles on one tubular are radially aligned with magnetic poles of an opposite polarity on adjacent tubulars.

19. The method of claim 15, wherein the magnetizing coils are substantially simultaneously connected and disconnected from the electrical power.

20. The method of claim 15, wherein:

the plurality of magnetizing coils comprise a plurality of groups of magnetizing coils, each group including at least two magnetizing coils; and the groups of magnetizing coils are sequentially connected and disconnected from the electrical power.

* * * * *